United States Patent
Bolz

(10) Patent No.: US 7,208,848 B2
(45) Date of Patent: Apr. 24, 2007

(54) DEVICE FOR POWER REDUCTION DURING THE OPERATION OF AN INDUCTIVE LOAD

(75) Inventor: Stephan Bolz, Pfatter (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/483,696

(22) Filed: Jul. 10, 2006

(65) Prior Publication Data

US 2007/0007930 A1    Jan. 11, 2007

(30) Foreign Application Priority Data

Jul. 8, 2005    (DE) .................. 10 2005 032 085

(51) Int. Cl.
*B60L 1/00*    (2006.01)
(52) U.S. Cl. ........................................ 307/9.1
(58) Field of Classification Search ............ 307/9.1, 307/10.1; 320/140, 104
See application file for complete search history.

(56) References Cited

U.S. PATENT DOCUMENTS 5,717,318 A * 2/1998 Matsuda et al. ............ 323/273
5,932,934 A    8/1999 Hofstetter

FOREIGN PATENT DOCUMENTS

EP    0 865 150 A2    9/1998

\* cited by examiner

*Primary Examiner*—Shawn Riley
(74) *Attorney, Agent, or Firm*—Laurence A. Greenberg; Werner H. Stemer; Ralph E. Locher

(57) ABSTRACT

A device for power reduction during an operation of an inductive load, which is operated in a turn-on phase with an increased supply voltage and in a holding phase statically or in PWM operation with the on-board voltage, has a transistor disposed between the on-board voltage source and the inductive load as a switch. A further transistor is connected in series with this transistor and both the source terminals and also the gate terminals of both transistors are connected to one another. With this circuit configuration unwanted current flows are prevented through the substrate diodes of both transistors.

4 Claims, 3 Drawing Sheets

DEVICE FOR POWER REDUCTION DURING THE OPERATION OF AN INDUCTIVE LOAD

BACKGROUND OF THE INVENTION

Field of the Invention

Rapidly switching inductive loads are increasingly required in vehicle electronics. Typical examples of use are electromagnetic fuel injection valves for diesel or petrol engines (high-pressure direct injection pump nozzle systems, HPDI), three-phase frequency converter for operating electric motors/generators using electronic commutation (ISG), bidirectional DC/DC converter (e.g. 14/42 V for integrated starter generators ISG) or electromagnetic valve trains (EVT).

For operating voltages >200V, MOSFET power transistors are mostly used as switches, with N-channel types preferably being used for cost-saving reasons. When reference is made to a "transistor" below, an N-channel MOSFET power transistor is meant in each instance.

By way of example, during the operation of electromagnetic injection valves, a rapid increase of current is desirable for start-up, which is only possible however with an increased operating voltage V+ compared with the conventional 12V on-board network voltage Vbat due to the valve's own inductivity. After reaching a predetermined current value, the valve current is adjusted to a similar predetermined lower value by a PWM operation (pulse width modulation).

A principle circuit known and suited to this mode of operation is depicted in FIG. 1. The voltage curve is shown in FIG. 2a and the current curve of a switching process is shown in FIG. 2b.

A coil L1 of a fuel injection valve (not shown in further detail) can be connected to the increased supply voltage V+ by means of a first transistor T1 and to the reference potential by a second transistor T2. A freewheeling diode D1 conducting from the reference potential to the source terminal is switched between the source terminal of the first transistor T1 and the reference potential, and a recuperation diode D2 conducting from the drain terminal to the positive pole of the increased operating voltage V+ is switched between the drain terminal of the second transistor T2 and the increased operating voltage V+.

Both transistors T1 and T2 are switched to conduct when the turn-on process is started. The increased supply voltage V+ is now present at coil L1 (FIG. 2a) and the current through the coil increases rapidly (FIG. 2b).

When a nominal upper current value is reached, the first transistor T1 is switched to non-conductive and the coil current now flows through the free-wheeling diode D1 and the second transistor T2, whereby it decreases slowly. If the current now reaches a nominal lower value, the first transistor T1 is switched to conductive again, whereupon the coil current increases once more. The repeated conductive/non-conductive switching of the first transistor T1 allows the coil current to be maintained at an approximately constant value during the on-period of the valve. At the end of the on-period, both transistors T1 and T2 are simultaneously switched to non-conductive, whereupon the coil L1 discharges across the two diodes D1, D2 into the energy source V+.

The disadvantages with this circuit configuration are:

a) a comparatively poorer efficiency, since the increased supply voltage V+ must first be generated by a switching controller from the on-board network voltage (Vbat=12V), and during the switching process, a high voltage and a high current are present at the same time at the first transistor T1 (switching losses);

b) the high instantaneous power at the first transistor T1 requires very short switching times, which in turn has a noticeable negative effect with EMC radiation (electromagnetic losses). Even with additional, expensive measures such as screening the cable harness leading to the fuel injection valve, the required limit values can only be maintained with difficulty; and c) a powerful, expensive non-illustrated switching controller is required to generate the increased supply voltage V+ from the on-board network voltage Vbat, since it must supply the entire power to operate the valve.

Circuits are thus preferably used, which allow a functional separation of a rapid current build-up from an increased supply voltage V+ at the beginning of the start-up and the supply with the (lower) operating current during the so-called holding phase from a lower voltage, the on-board network voltage Vbat for instance.

FIG. 3 shows another known principle circuit and suitable for such a mode of operation. FIG. 4a shows the voltage curve and FIG. 4b the current curve of a switching process during static operation, while FIG. 5a shows the voltage curve and FIG. 5b the current curve of a switching process during PWM operation. With the circuit according to FIG. 3, the components T1, T2, D1, D2, L1, and V+ are disposed in the same way as with the circuit according to FIG. 1. In addition, a series connection of the on-board voltage source Vbat, a third transistor T3 and a third diode D3 is inserted between the reference potential and the source terminal of the first transistor T1.

The negative pole of the on-board voltage source Vbat lies on the reference potential, the positive pole is linked to the drain terminal of the third transistor T3 and the third diode D3 is conductive from the source terminal of the third transistor T3 to the source terminal of the first transistor T1. The first and second transistor T1 and T2 are switched to conductive at the beginning of the switching process. The current now flows from the supply voltage source V+ through the coil L1. When a nominal upper current value (FIG. 4b) is reached, the first transistor T1 is switched to non-conductive and the third transistor T3 is switched to conductive, with the current now flowing from the on-board voltage source Vbat (FIG. 4a) through the third transistor T3, the third diode D3, the coil L1, the second transistor T2 and back to the on-board voltage source Vbat.

The coil current depends on the on-board voltage Vbat, the flow voltage of the third diode D3 and the sum of the resistances in the current path (coil resistance, line and contact resistances, turn-on resistance of the transistors etc.):

$$I_{L1}=(V_{bat}-V_{D3})/\Sigma R_i$$

As, in practice, both the on-board voltage Vbat and also the sum of the resistances vary considerably, the coil current can only be controlled in this manner with difficulty.

The third transistor T3 is thus mostly not statically switched to conductive during the holding phase, but is periodically switched to conductive and non-conductive (FIG. 5a), whereby an average current value is set in the coil L1 (FIG. 5b). By suitably varying the pulse duty factor, the desired current value can thus be controlled.

All in all, this circuit concept has some advantages in terms of activating magnetic valves compared with the circuit according to FIG. 1:

a) the efficiency of the switching controller (not shown), which generates the increased supply voltage V+ from the on-board network voltage Vbat, plays a less significant role, as the increased supply voltage V+ is only applied during the current build-up;

b) this enables the switching controller to be designed significantly smaller and thus more cost-effectively;

c) the high instantaneous power at the first transistor T1 only occurs once during the non-conductive switching. As the third transistor T3 is fed from an essentially lower voltage (here the on-board voltage Vbat), the switching losses are accordingly lower;

d) this allows a significant increase in the switching times, which has a noticeably positive effect with EMC radiation; and e) the additional, expensive screening of the cable harness leading to the fuel injection valve can be dispensed with and the required EMC limit values are essentially easier to maintain.

The third transistor T3 is configured like all other transistors as a MOSFET, since the power loss is minimal due to the very small turn-on resistance. However, MOSFETS have an intrinsic substrate diode not yet mentioned, which is however operated in normal mode in the blocking direction and does not cause further problems. These substrates are shown in the drawing, but without a separate reference symbol since they belong to the respective transistor.

A circuit concept with a dual voltage supply results in however that with a turned-on first transistor T1, the voltage at the coil L1 is considerably higher than the on-board network voltage Vbat.

Without the third diode D3, the substrate diode of the current-blocking third transistor T3 would now however be operated in the flow direction and a considerable current would flow from the increased supply voltage V+ through the transistors T1 and T3 to the on-board voltage Vbat. This would result in these transistors being damaged, which is avoided however by the blocking third diode D3.

A significant power loss results as the coil current flows through the diode D3 when the third transistor T3 in the holding phase is switched conductively. In practice, this results in diode D3 being the most heavily loaded component of the entire circuit, in terms of thermal loading, which in turn involves significant subsequent effort during the cooling process.

This problem has been resolved thus far by:

a) a Schottky diode with a minimal flow voltage (this is however restricted by the fact that there are hardly any high-current Schottky diodes with a corresponding blocking voltage available, such that their cut-off current significantly increases with an increase in temperature, and that these diodes are very expensive); or b) a power diode with a corresponding housing form (for instance TO220) and an elaborate cooling process at the device housing were used as diode D3.

SUMMARY OF THE INVENTION

It is accordingly an object of the invention to provide a device for power reduction during the operation of an inductive load that overcomes the above-mentioned disadvantages of the prior art devices of this general type, which reduces the power loss arising from the third diode D3 and the increased costs.

With the foregoing and other objects in view there is provided, in accordance with the invention, a device for power reduction during an operation of an inductive load. The device contains a voltage source having a positive pole defining a first potential and a negative pole defining a reference potential, and an on-board voltage source having an on-board positive pole and an on-board negative pole connected to the negative pole and also defining the reference potential. The on-board positive pole defines a second potential being less than the first potential. A first transistor is provided and has a source terminal connected to a first terminal of the inductive load, a drain terminal connected to the positive pole of the voltage source, and a gate terminal. A second transistor is provided and has a drain terminal connected to a second terminal of the inductive load, a source terminal connected the negative pole of the voltage source, and a gate terminal. A freewheeling diode is connected between and conducts from the reference potential to the first terminal of the inductive load. A recuperation diode is connected between and conducts from the second terminal of the inductive load to the positive pole of the voltage source. A series circuit is provided and has a third transistor, a fourth transistor and the on-board voltage source. The series circuit is connected between the reference potential and the first terminal of the inductive load. The third transistor has a source terminal, a gate terminal and a drain terminal connected to the on-board positive terminal of the on-board voltage source. The fourth transistor is connected between the third transistor and the first terminal of the inductive load. The fourth transistor has a source terminal connected to the source terminal of the third transistor, a drain terminal connected to the on-board positive pole of the on-board voltage source, and a gate terminal connected to the gate terminal of the third transistor.

Preferably, the first, second, third and fourth transistors are power MOSFET transistors.

In accordance with an added feature of the invention, with a high voltage at the inductive load, the first transistor is in a conductive state, the third and fourth transistors are in a non-conductive state, the fourth transistor has a substrate diode preventing current flowing from the voltage source to the on-board voltage source. With a low voltage at the inductive load, the first, third and fourth transistors are all in a non-conductive state, and the third transistor has a substrate diode preventing a current flowing from the on-board voltage source to the inductive load.

In accordance with a concomitant feature of the invention, the first transistor may only be controlled in a conductive manner, if the second and third transistors are not conductive; and the second and third transistors may only be controlled so that they become conductive when the first transistor is not conductive.

Other features which are considered as characteristic for the invention are set forth in the appended claims.

Although the invention is illustrated and described herein as embodied in a device for power reduction during the operation of an inductive load, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The solution of the above-mentioned problem is thus to replace the third diode D3 by a fourth MOSFET transistor T4 which is operated inversely to the third transistor T3. By disposing the transistor T4 inversely to the third transistor T3, the substrate diode of the transistor T6 is operated so that it blocks current when the transistor T1 is turned-on, in the turn-on phase.

Figure 6:
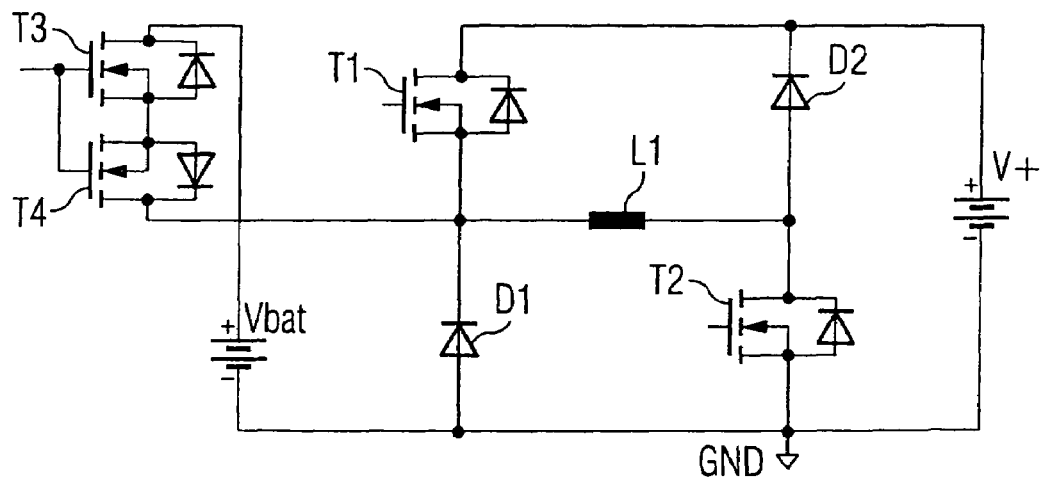
FIG. 6 is a circuit diagram of an exemplary embodiment of a principle circuit for power reduction during the operation of an inductive load according to the invention.

Referring now to the figures of the drawing in detail and first, particularly, to FIG. 6 thereof, there is shown an exemplary embodiment according to the invention. The principle circuit of this exemplary embodiment substantially corresponds to the circuit according to FIG. 3, with just the third diode D3 being replaced by the fourth transistor T4 operated inversely to transistor T3.

A source terminal of the fourth transistor T4 is connected to a source terminal of the third transistor T3, while a drain terminal of the fourth transistor T4 is connected to the source terminal of the first transistor T1.

Gate terminals of the two transistors T3 and T4 are connected to one another and are controlled by a non-illustrated common signal source.

Figure 1:
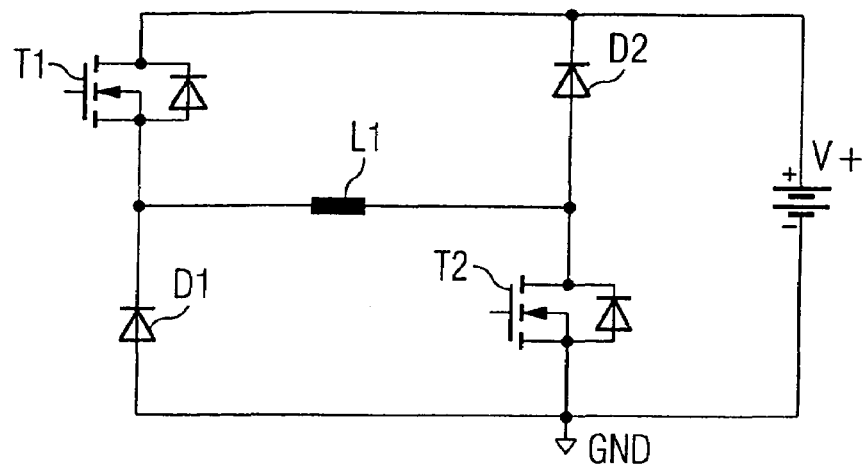
FIG. 1 is a circuit diagram of a first exemplary embodiment of a known, principle circuit for power reduction during the operation of inductive loads.
Figure 2A:
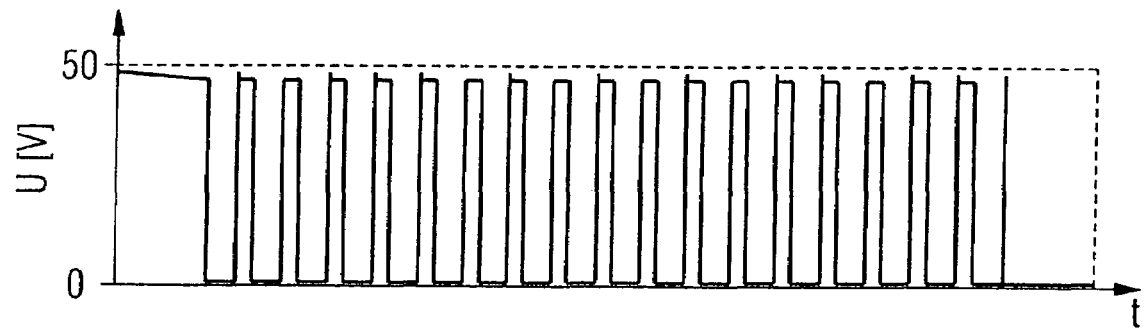
FIG. 2a is a graph showing a voltage curve of a switching process of the circuit according to FIG. 1.
Figure 2B:
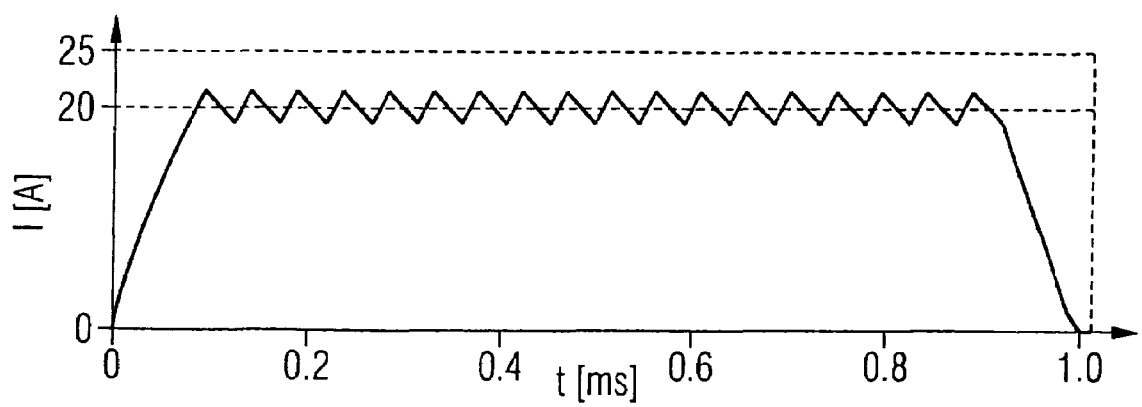
FIG. 2b is a graph showing a current curve of a switching process of the circuit according to FIG. 1.
Figure 3:
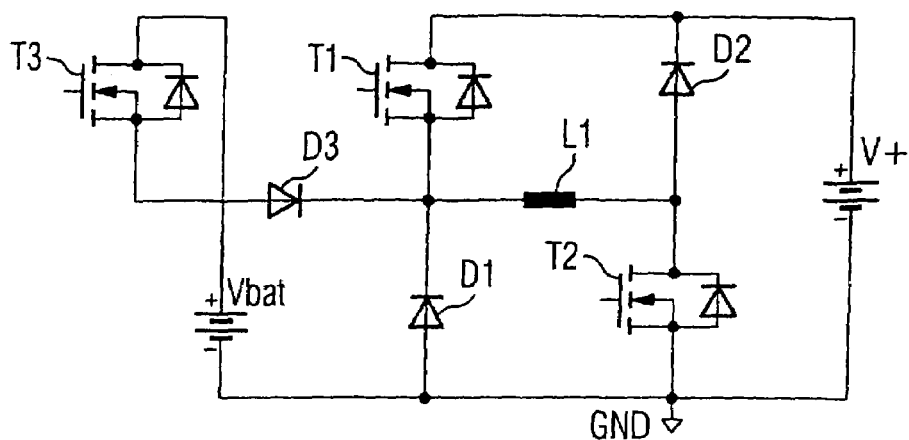
FIG. 3 is a circuit diagram of a second exemplary embodiment of a further known principle circuit for power reduction during the operation of inductive loads.

The voltage and current curve with a switching process of the circuit according to FIG. 6 corresponds to the voltage and current curve with a switching process of the circuit according to FIG. 3.

Figure 5A:
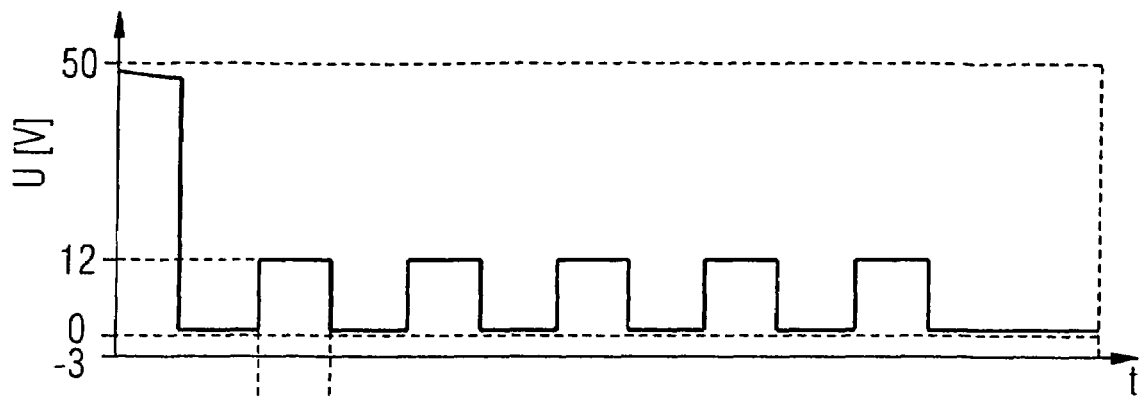
FIG. 5a is a graph showing a voltage curve of a pulse width modulated switching process of the circuit according to FIG. 3 or 6.
Figure 5B:
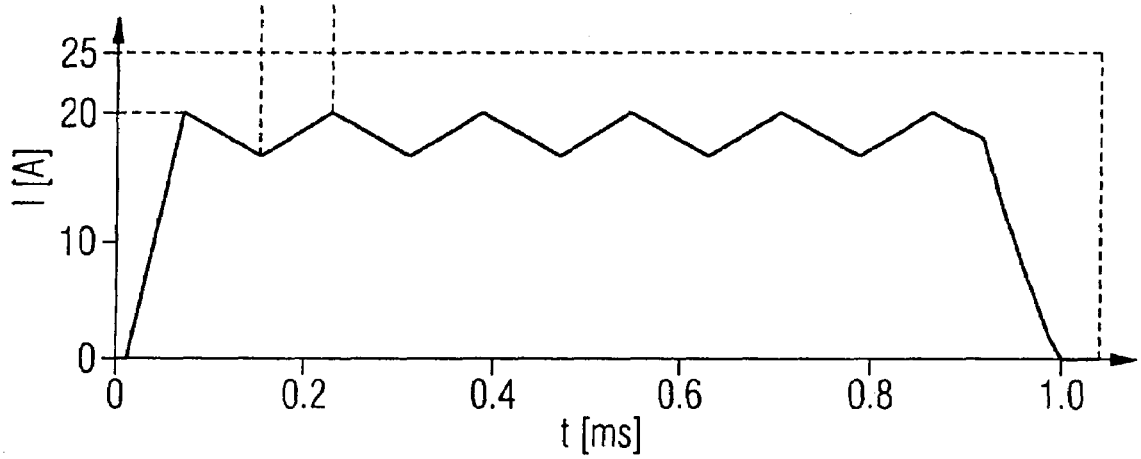
FIG. 5b is a graph showing a current curve of a pulse width modulated switching process of the circuit according to FIG. 3 or 6.

FIG. 5a thus shows the voltage curve and FIG. 5b the current curve of a switching process during PWM operation.

Figure 4A:
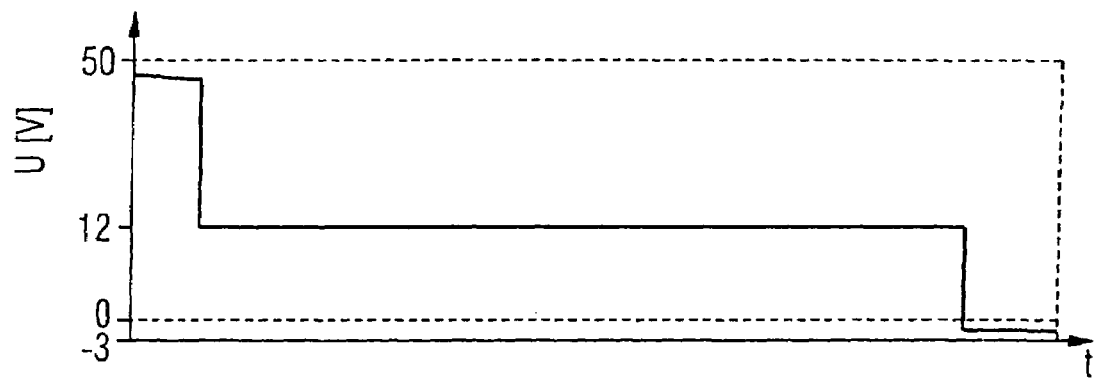
FIG. 4a is a graph showing the voltage curve of a static switching process of the circuit according to FIG. 3 or 6.
Figure 4B:
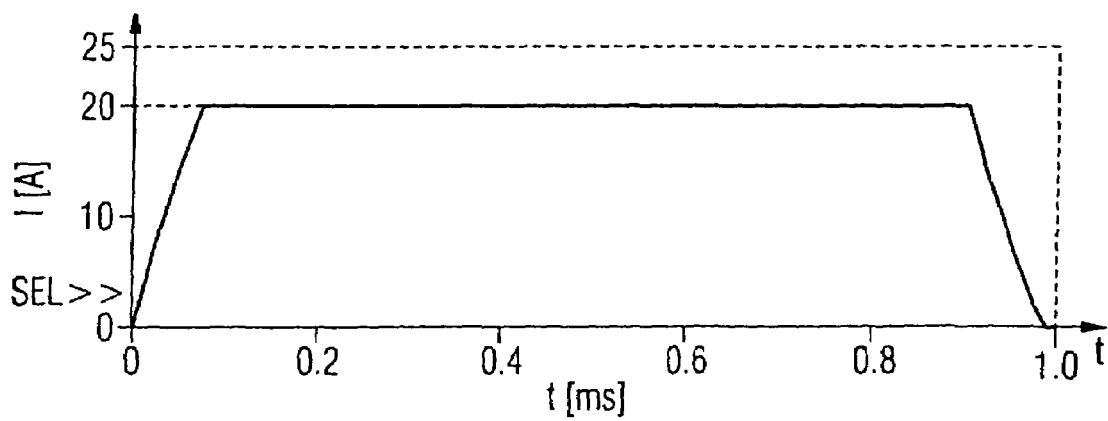
FIG. 4b is a graph showing the current curve of a static switching process of the circuit according to FIG. 3 or 6.

If the circuit is statically operated however, FIGS. 4a and 4b apply.

The function of the circuit is described below for PWM operation.

At the beginning of a switching process, the first and the second transistor T1 and T2 are switched to conduct. The increased supply voltage V+ is present at the coil L1. Current flows from the supply voltage source V+ through the coil L1.

The substrate diode of the fourth transistor T4 prevents current flowing from the supply voltage source V+also to on-board voltage source V+Vbat.

If a desired operating current value is reached in the coil L1 (FIG. 5b), the first transistor T1 is not conductive, whereupon the current flowing through the coil L1 reduces slowly.

The substrate diode of the non-conductive first transistor T1 now prevents current from flowing from the supply voltage source V+ also to the on-board voltage source Vbat.

If the current now reaches a lower nominal value, the third transistor T3 and with it the fourth transistor T4 is switched to a conductive state with a high gate-source voltage (e.g. 10V), with the current now flowing from the on-board voltage source Vbat through the third transistor T3, the fourth transistor T4, the coil L1, the second transistor T2 and back to the on-board voltage source Vbat and increasing again slowly.

By repeatedly switching the two transistors T3, T4 so that they conduct and do not conduct (non-conductive switching with a low gate-source-voltage, e.g. 0V), the coil current can thus be maintained at an approximately constant value during the holding duration of the valve. At the end of the on-period, all four transistors T1 to T4 are simultaneously switched to be non-conductive, whereupon the coil L1 discharges via the freewheeling diode D1 and the recuperation diode D2 into the energy source V+.

If T3 and T4 are switched to be non-conductive:

a) the substrate diode of transistor T3 prevents current flowing from the on-board voltage source Vbat to the coil L1, with a low voltage at the coil L1 (first transistor T1 not switched to conductive); and b) the substrate diode of transistor T4 prevents current flowing from the supply voltage source V+ to the on-board voltage source Vbat, with a high voltage at the coil L1 (first transistor T1 switched to conductive).

According to a measurement undertaken on a circuit according to FIG. 6, the power loss at the transistor T4 reduces by 63.7% by replacing a diode D3 by an inversely operated transistor T4 used in accordance with the invention, with a high-current Schottky diode being used as diode D3 as comparison.

The advantages of the inventive circuit according to FIG. 6 compared with a circuit according to FIG. 3 are as follows:

a) lower power loss in the transistor T4 than in a diode D3, since the voltage drop at the turn-on resistance of a MOSFET (T4) is lower than the flow voltage of a diode (D3);

b) no further components are necessary, since the control circuit of the transistor T3 can be used to control the transistor T4;

c) the circuit is more cost-effective, since the expensive diode D3 is replaced by a more cost-effective MOSFET T4;

d) the circuit is more cost-effective, since a simpler cooling process concept can be used; and e) the circuit is more cost-effective, since the MOSFETs T3 and T4 can be of the same type, which can be advantageous in terms of assembly (non-variable part concept).

This application claims the priority, under 35 U.S.C. § 119, of German patent application No. 10 2005 032 085.6, filed Jul. 8, 2005; the entire disclosure the prior application is herewith incorporated by reference.

I claim:

1. A device for power reduction during an operation of an inductive load, comprising:

a voltage source having a positive pole defining a first potential and a negative pole defining a reference potential;

an on-board voltage source having an on-board positive pole and an on-board negative pole connected to said negative pole and also defining the reference potential, said on-board positive pole defining a second potential being less than the first potential;

a first transistor having a source terminal connected to a first terminal of the inductive load, a drain terminal connected to said positive pole of said voltage source, and a gate terminal;

a second transistor having a drain terminal connected to a second terminal of the inductive load, a source terminal connected said negative pole of said voltage source, and a gate terminal;

a freewheeling diode connected between and conducting from the reference potential to the first terminal of the inductive load;

a recuperation diode connected between and conducting from the second terminal of the inductive load to said positive pole of said voltage source; and a series circuit including a third transistor, a fourth transistor and said on-board voltage source, said series circuit connected between the reference potential and the first terminal of the inductive load, said third transistor having a source terminal, a gate terminal and a drain terminal connected to said on-board positive terminal of said on-board voltage source, said fourth transistor connected between said third transistor and the first terminal of the inductive load, said fourth transistor having a source terminal connected to said source terminal of said third transistor, a drain terminal connected to said on-board positive pole of said on-board voltage source, and a gate terminal connected to said gate terminal of said third transistor.

2. The device according to claim 1, wherein said first, second, third and fourth transistors are power MOSFET transistors.

3. The device according to claim 1, wherein:

with a high voltage at the inductive load, said first transistor in a conductive state, said third and fourth transistors in a non-conductive state, said fourth transistor having a substrate diode preventing current flowing from said voltage source to said on-board voltage source; and with a low voltage at the inductive load, said first, third and fourth transistors being in the non-conductive state, said third transistor having a substrate diode preventing a current flowing from said on-board voltage source to the inductive load.

4. The device according to claim 1, wherein:

said first transistor may only be controlled in a conductive manner, if said second and third transistors are not conductive; and said second and third transistors may only be controlled so that they become conductive when said first transistor is not conductive.

* * * * *